(12) United States Patent
Thangellapalli et al.

(10) Patent No.: US 11,831,678 B2
(45) Date of Patent: Nov. 28, 2023

(54) GENERATING URLS TO DETECT AUTONOMOUS PROGRAMS SYSTEMS AND METHODS

(71) Applicant: Citrix Systems, Inc., Fort Lauderdale, FL (US)

(72) Inventors: Rakesh Kumar Thangellapalli, Milpitas, CA (US); Rama Rao Katta, Sunnyvale, CA (US); Kasirao Velugu, Bengaluru (IN); Praveen Dandin, Santa Clara, CA (US); Aman Agrawal, Bengaluru (IN); Seth Kenneth Keith, Scotts Valley, CA (US); Ratnesh Singh Thakur, San Jose, CA (US); Josephine Suganthi Joseph Leo, Sunnyvale, CA (US)

(73) Assignee: Citrix Systems, Inc., Fort Lauderdale, FL (US)

(*) Notice: Subject to any disclaimer, the term of this patent is extended or adjusted under 35 U.S.C. 154(b) by 317 days.

(21) Appl. No.: 16/808,731

(22) Filed: Mar. 4, 2020

(65) Prior Publication Data
US 2021/0281605 A1 Sep. 9, 2021

(51) Int. Cl.
*H04L 29/00* (2006.01)
*H04L 9/40* (2022.01)
*G06F 16/955* (2019.01)

(52) U.S. Cl.
CPC ...... *H04L 63/1483* (2013.01); *G06F 16/9566* (2019.01); *H04L 63/1416* (2013.01)

(58) Field of Classification Search
CPC .............. H04L 63/1483; H04L 63/1416; G06F 16/9566
USPC .......................................................... 726/23
See application file for complete search history.

(56) References Cited

U.S. PATENT DOCUMENTS

| | | | |
|---|---|---|---|
| 8,645,848 B2 * | 2/2014 | Lesh | G06F 3/0482 715/810 |
| 9,105,027 B2 * | 8/2015 | Hammad | G06Q 20/12 |
| 9,542,545 B2 * | 1/2017 | Shepler | G06F 21/79 |

* cited by examiner

*Primary Examiner* — Brandon Hoffman
*Assistant Examiner* — Michael D Anderson

(57) ABSTRACT

Described embodiments provide systems and methods for detecting autonomous programs is provided. A device, intermediary to a plurality of clients and a plurality of servers, can receive a first request from a first client of the plurality of clients to a server of the plurality of servers via a connection between the device and the first client. The device can include, into a response from the server to the first client, a uniform resource locator (URL) comprising one or more randomly generated characters within a predetermined character space. The device can determine that the first client has an autonomous program responsive to receiving a second request from the first client using the URL. The device can terminate, responsive to the determination, the connection to the first client.

20 Claims, 5 Drawing Sheets

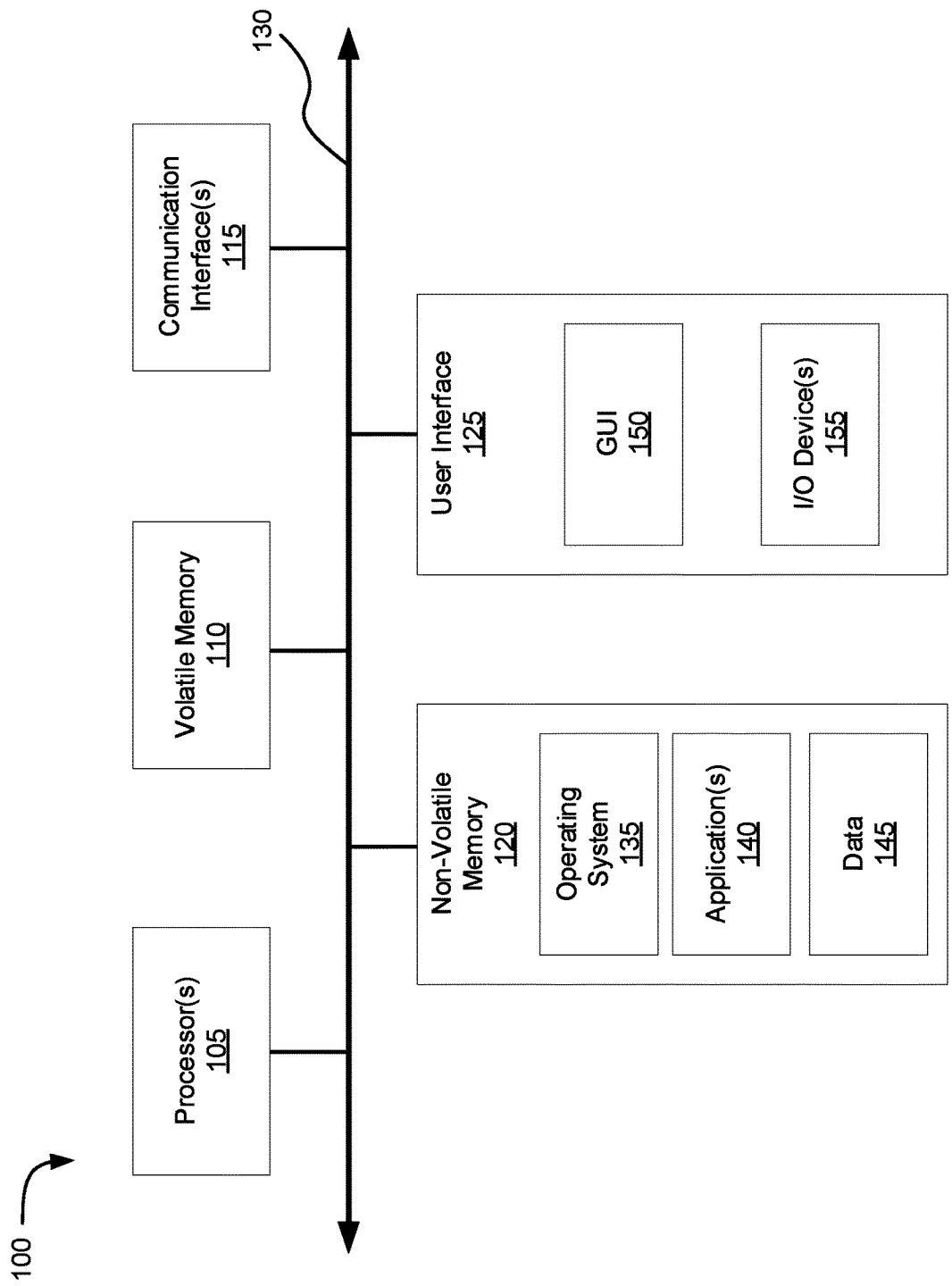

GENERATING URLS TO DETECT AUTONOMOUS PROGRAMS SYSTEMS AND METHODS

BACKGROUND

In a network environment, a plurality of client devices can be connected to one or more servers to access applications provided by the servers. As a level of traffic to a server increases, the quality of service the server can provide may decrease. For example, the server can be overloaded or have insufficient resources to handle the traffic. The traffic can include attempts to access the application or server from malicious programs or actors. The overload condition can result in service disruptions or failures.

SUMMARY

The present disclosure is directed towards generating a URL to detect and identify traffic from clients having autonomous programs or bots. A device intermediary to a plurality of clients and a plurality of servers can receive and forward requests and responses between the clients and servers. The device can generate and include in a response to a client a URL that includes one or more randomly generated characters within a predetermined character space. For example, the device can provide the response with the URL to one or more clients. The device can identify and track any requests to the URL. In embodiments, if the device receives a request to the URL from a client, the device can determine that the respective client has or is executing an autonomous program (e.g., bot) and it not an actual client or actual user. The device can terminate a connection to the respective client in response to determine that the respective client has or is executing an autonomous program.

In at least one aspect, a method is provided. The method can include receiving, by a device intermediary to a plurality of clients and a plurality of servers, a first request from a first client of the plurality of clients to a server of the plurality of servers via a connection between the device and the first client. The method can include including, by the device into a response from the server to the first client, a uniform resource locator (URL) comprising one or more randomly generated characters within a predetermined character space. The method can include determining, by the device, that the first client has an autonomous program responsive to receiving a second request from the first client using the URL. The method can include terminating, by the device responsive to the determination, the connection to the first client.

In embodiments, the method can include generating, by the device, the URL to include one or more random alphanumeric characters. The method can include generating, by the device, the URL to be one of blank or invisible to on a web page displayed on one or more clients of the plurality of clients. The method can include generating, by the device, a plurality of URLs within a web page. The plurality of URLs can include the URL comprising the one or more randomly generated characters and one or more URLs corresponding to one or more valid addresses of one or more other web pages. The method can include generating, by the device, a session associated with the URL having a time out value. The method can include determining, by the device, the URL has been available to the first client for a period of time equal to the time out value. The method can include terminating, by the device, the session and the URL. The method can include including, by the device, a subsequent URL in a subsequent response to the first client, the subsequent URL associated with a subsequent session.

In embodiments, the method can include providing, by the device, the response with the URL to multiple clients of the plurality of clients connected to the device. The method can include providing, by the device, the first request to the server, the first request including a Hypertext Transfer Protocol (HTTP) request. The method can include receiving, by the device, the response from the server, the response including an HTTP response. The method can include modifying, by the device, the HTTP response from the server to include the URL. The method can include providing, by the device to the first client, the HTTP response with the URL.

In at least one aspect, a system is provided. The system can include a device intermediary to a plurality of clients and a plurality of servers. The device can include one or more processors coupled to memory. The device can be configured to receive a first request from a first client of the plurality of clients to a server of the plurality of servers via a connection between the device and the first client. The device can be configured to include, into a response from the server to the first client, a uniform resource locator (URL) comprising one or more randomly generated characters within a predetermined character space. The device can be configured to determine that the first client has an autonomous program responsive to receiving a second request from the first client using the URL. The device can be configured to terminate, responsive to the determination, the connection to the first client.

In embodiments, the device can be configured to generate the URL to include one or more random alphanumeric characters. The device can be configured to generate the URL to be one of blank or invisible to on a web page displayed on one or more clients of the plurality of clients. The device can be configured to generate a plurality of URLs within a web page. The plurality of URLs can include the URL comprising the one or more randomly generated characters and one or more URLs corresponding to one or more valid addresses of one or more other web pages. The device can be configured to generate a session associated with the URL having a time out value. The device can be configured to determine the URL has been available to the first client for a period of time equal to the time out value. The device can be configured to terminate the session and the URL. The device can be configured to include a subsequent URL in a subsequent response to the first client, the subsequent URL associated with a subsequent session.

In embodiments, the device can be configured to provide the first request to the server, the first request including a Hypertext Transfer Protocol (HTTP) request. The device can be configured to receive the response from the server, the response including an HTTP response. The device can be configured to modify the HTTP response from the server to include the URL. The device can be configured to provide, to the first client, the HTTP response with the URL.

In at least one aspect, a non-transitory computer readable medium is provided. The non-transitory computer readable medium can store program instructions for causing one or more processors to receive a first request from a first client of a plurality of clients to a server of a plurality of servers via a connection to the first client. The instructions can cause the one or more processors to include, into a response from the server to the first client, a uniform resource locator (URL) comprising one or more randomly generated characters within a predetermined character space. The instructions can cause the one or more processors to determine that the first client has an autonomous program responsive to receiving a second request from the first client using the URL. The instructions can cause the one or more processors to terminate, responsive to the determination, the connection to the first client.

In embodiments, the instructions can cause the one or more processors to generate a session associated with the URL having a time out value. The instructions can cause the one or more processors to determine the URL has been available to the first client for a period of time equal to the time out value. The instructions can cause the one or more processors to terminate the session and the URL. The instructions can cause the one or more processors to include a subsequent URL in a subsequent response to the first client, the subsequent URL associated with a subsequent session.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

FIG. 1A is a block diagram of embodiments of a computing device;

Figure 1B:
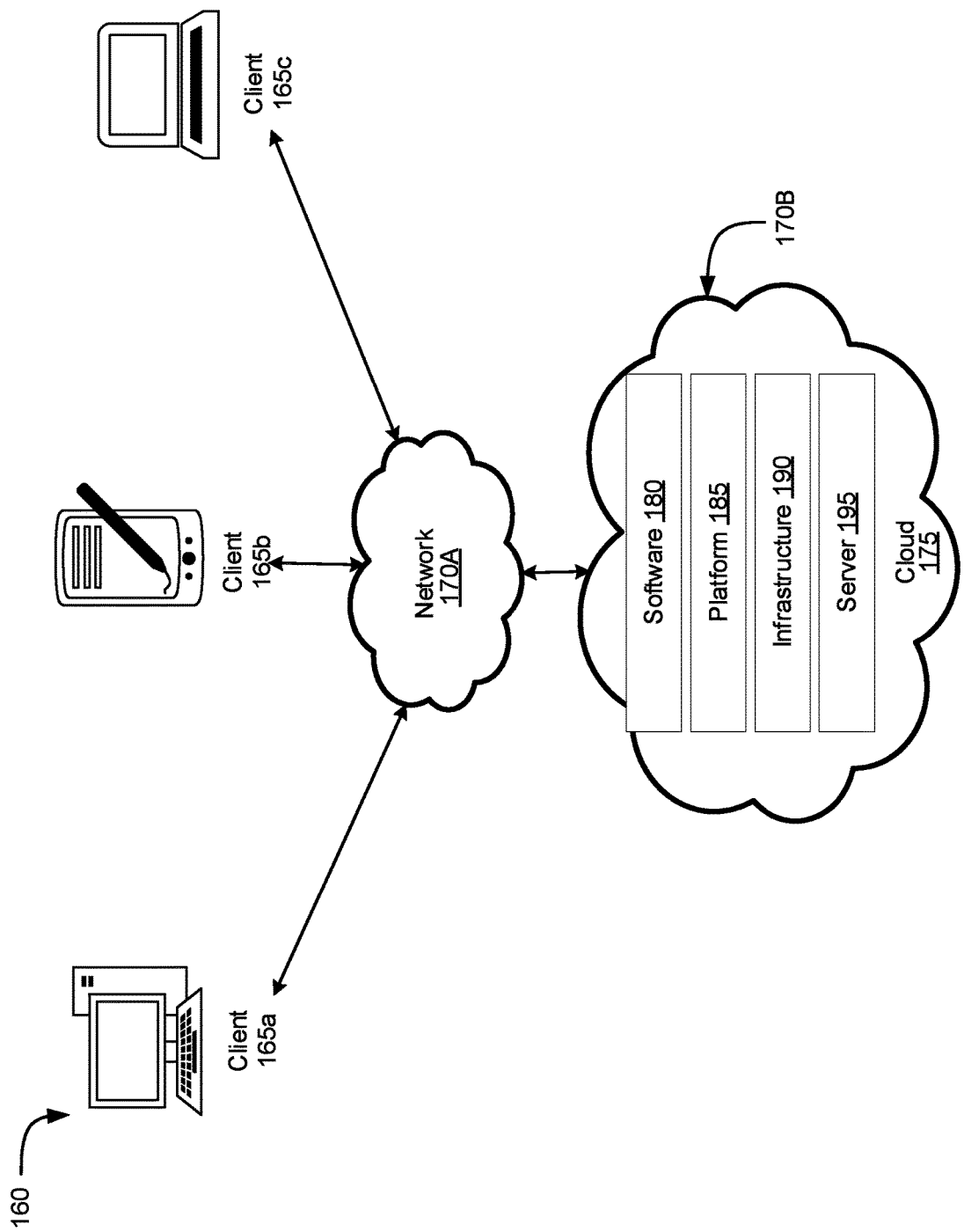
FIG. 1B is a block diagram depicting a computing environment comprising client device in communication with cloud service providers.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes embodiments of systems and methods for generating URLs to detect autonomous programs.

A. Network and Computing Environment

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 165 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Generating URLs to Detect Autonomous Programs

The present disclosure is directed towards generating a URL (e.g., trap URL) to detect and identify traffic from bots or autonomous programs. An intermediary device, intermediary to a plurality of clients and a plurality of servers, can generate and include a URL that includes one or more randomly generated characters within a predetermined character space in a response from a server to a client. The URL can be generated such that the URL appears to be blank or invisible on a web page, for example, to a user of a client device. In embodiments, the URL can include or correspond to a tracking character or tracking web page and the device can track and monitor traffic or requests to the URL. For example, the device can determine that a client has or is executing an autonomous program in response to the client transmitting a request to the URL. The device can terminate one or more connections to the client in response to detecting the request to the URL.

Bots or autonomous programs (e.g., web robots) are prevalent in todays network traffic. Bots can imitate or replace human user behavior and perform tasks on a faster pace than a human user of a client device. However, the traffic from bots can overwhelm and/or slow down a networks resources resulting in disrupted or delayed service to human users of one or more client devices. The bots can include malicious or attack bots programmed to break into accounts, steal information and/or perform malicious activities. Thus, it is increasingly important to detect and differentiate traffic and/or connections from bots versus a human user.

The systems and methods described herein can generate a URL to detect traffic and/or requests from clients having or executing an autonomous program. For example, the autonomous programs or bots can attempt to access every link provided in a response (e.g., web page) irrespective of a location, nature and/or properties of the link in order to gather data for further analysis. A device intermediary to a plurality of clients and a plurality of servers can include the URL having one or more randomly generated characters in responses to the clients to detect and track the autonomous program behavior based in part on requests to the URL. The device can determine if a connection is to a bot or a human user of a client device using the URL.

In embodiments, the device can generate the URL to include one or more randomly generates alphanumeric characters that can fit or be formed within a predetermined character space (e.g., single character space). The device can include, for example, the URL as a Hypertext Markup Language (HTML) hyperlink to a single space character or blank web page. The URL can be invisible or not visible to a human eye such that it is unlikely a human user of a client would interact with (e.g., click on) the URL and generate a request to the URL. Thus, the device can detect requests to the URL and determine the requests are from clients having or executing an autonomous program.

The device can generate or initiate a session for each URL and the session can include a time out value. The URL and session can be forcibly timed out or terminated when a time period for when the respective URL is available to one or more clients reaches or is equal to the time out value. The device can generate, after the time out event, a new or subsequent URL with a new or subsequent session and provide the subsequent URL in one or more subsequent responses to one or more clients. In embodiments, the URL can be the same across of clients connected to the device in a network or cluster in real-time or substantially real-time. For example, the device can provide the same URL in a plurality of response to a plurality of clients connected to and/or interacting with the device.

Figure 2:
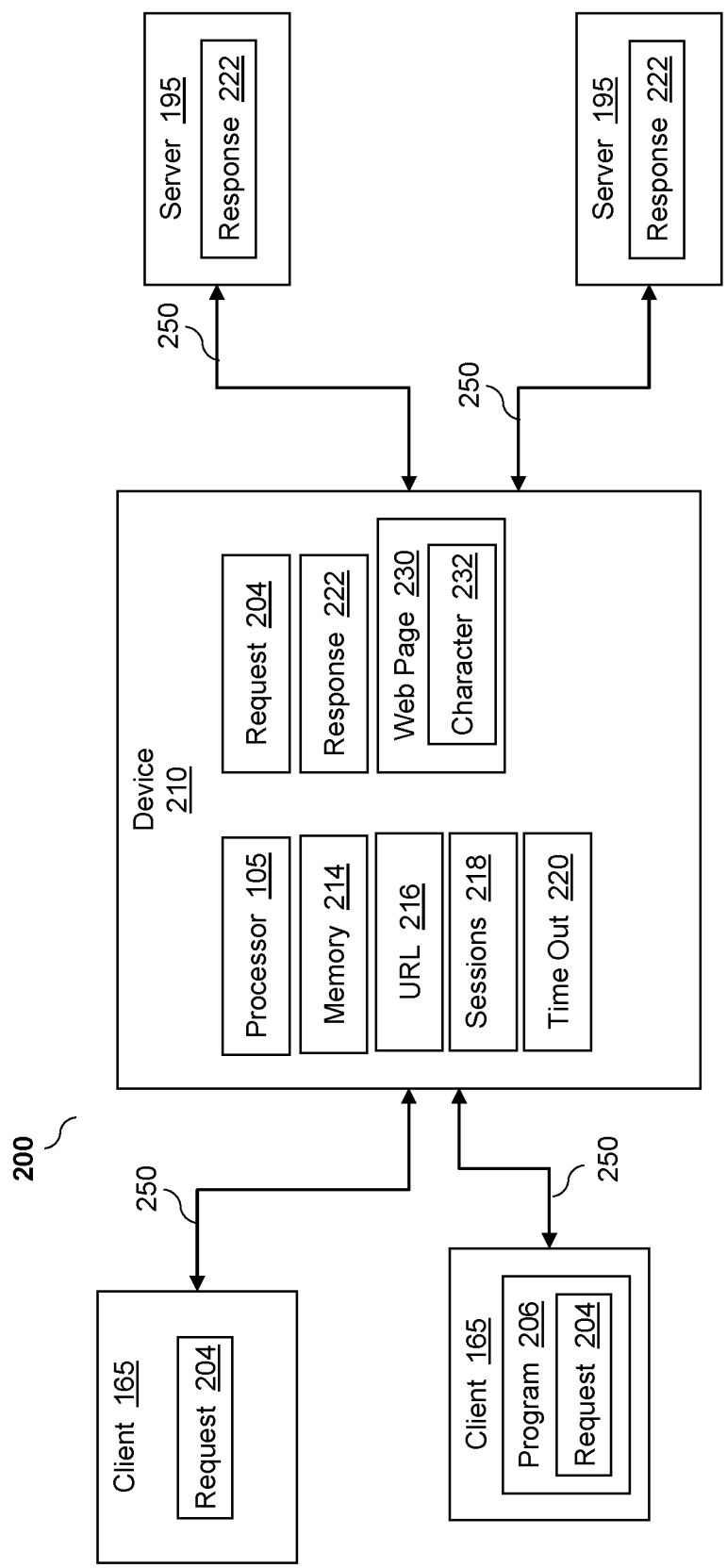
FIG. 2 is a block diagram of a system for generating URLs to detect autonomous programs, in accordance with an illustrative embodiment.

Referring now to FIG. 2, a system 200 having an intermediary device 210, intermediary to a plurality of clients 165 and a plurality of servers 195. The device 210 can handle or process one or more requests 204 from one or more clients 165 to one or more servers 195. The device 210 can handle or process one or more responses 222 from one or more servers 195 to one or more clients 165. The device 210 can generate and include a URL 216 having one or more randomly generated characters 232 in one or more responses 222 provided to the clients 165, for example, to detect actions or activity from one or more autonomous programs 206 executing at or imitating a client 165.

The device 210 can be implemented using hardware or a combination of software and hardware. For example, each component of the device 210 can include logical circuitry (e.g., a central processing unit or CPU) that responses to and processes instructions fetched from a memory unit (e.g., memory 214). Each component of the device 210 can include or use a microprocessor 105 or a multi-core processor 105. A multi-core processor 105 can include two or more processing units on a single computing component. Each component of the device 210 can be based on any of these processors, or any other processor capable of operating as described herein. Each processor 105 can utilize instruction level parallelism, thread level parallelism, different levels of cache, etc. For example, the device 210 can include at least one logic device such as a computing device or server having at least one processor 105 to communicate via a network 170. The components and elements of the device 210 can be separate components or a single component. For example, the device 210 can include combinations of hardware and software, such as one or more processors 105 configured to initiate stop commands, initiate motion commands, and transmit or receive event data, for example. The device 210 can include a structured set of data. For example, the device 210 can include and/or store a plurality of URLs 216 and/or metadata associated with the plurality of URLs 216.

The device 210 can include a memory component (e.g., memory 214) to store and retrieve data. The memory 214 can include a random access memory (RAM) or other dynamic storage device, coupled with the device 210 for storing information, and instructions to be executed by the device 210. The memory 214 can include at least one read only memory (ROM) or other static storage device coupled with the device 210 for storing static information and instructions for the device 210. The memory 214 can include a storage device, such as a solid state device, magnetic disk or optical disk, coupled with the device 210 to persistently store information and instructions.

The device 210 can generate one or more uniform resource locators (URLs) 216. In some embodiments, the device 210 can maintain and store metadata or information for the URLs 216 in the memory 214. A URL 216 can include one or more randomly generated characters 232. In embodiments, the URL 216 can correspond to, link to or point to a tracking character or tracking web page. The URL 216 can include or correspond to a HTML hyperlink to a predetermined character space of a web page 230. The predetermined character space can include a single character space of a web page 230 or multiple character spaces of a web page 230. The predetermined character space can include a predetermined location, portion or region of a web page 230. The URL 216 can be generated to be invisible to a human eye or human user of a client 165. The URL 216 can include a hidden link, false or fake link embedded within a response 222 or web page 230. The URL 216 can include or correspond to an icon, graphic or text included within a response 222 or web page 230 that links to, directs to or points to a single space character 232 of a web page 230. The URLs 216 can include a plurality of randomly generated or selected alphanumeric characters. In embodiments, the URLs 216 can include one or more randomly selected or generated numerals, letters and/or random alphanumeric characters or randomly selected or generated combination of numerals, letters and/or random alphanumeric characters.

In some embodiments, the device 210 can active or turn on a URL 216 functionality to generate and include the URL 216 in one or more responses 222. For example, the device 210 can detect an amount or level of traffic at the device 21 or at one or more servers 195 has reached a threshold level. The device 210 can begin monitoring the traffic to the device 210 or one or more servers 195 in response to the traffic reaching the threshold level. The device 210 can activate or turn on the URL 216 functionality in response to the traffic reaching the threshold level. In embodiments, the device 210 can generate and include a URL 216 having one or more randomly generated characters 232 in one or more responses 222 to one or more clients 165 when the URL 216 functionality is activated. The device 210 can de-activate or turn off the URL 216 functionality in response to the traffic falling below or being less than the threshold level. In some embodiments, the device 210 can activate or turn on the URL functionality at all times, for example, for all responses 222.

In some embodiments, the URL 216 can correspond to, link to or point to a tracking character. For example, the URL 216 can include or correspond to a tracking URL, tracking tool or web beacon. The device 210 can use the URL 216 to detect, monitor and/or track traffic or requests 204 to the URL 216 and/or the tracking character associated with the URL 216. The tracking character can be configured to fit within or be generated within a predetermined character space (e.g., single space character, single character space) of a web page 230. The tracking character can include or correspond to a blank (e.g., visibly empty) web page 230. The tracking character can include or correspond to a portion of a web page 230. In embodiments, the tracking character can include or correspond to a web beacon to track and monitor traffic, client behavior or requests to the respective tracking character via the URL 216.

The device 210 can establish or generate a session 218 for each URL 216. The session 218 can include a temporary interchange between two or more devices, for example between the device 210 and at least one client 165. The session 218 can include or correspond to a lifespan, a length of time or period of time that a corresponding URL 216 is active and/or available to at least one client 165. The session 218 can include a time out value 220. Each URL 216 can be assigned or associated with at least one session 218. The time out value 220 can include a length of time or period of time that a session 218 is active. For example, when the time out value 220 expires or a period of time a URL 216 is available to a client 165 reaches or is equal to the time out value 220, the device 210 can terminate, close or end (e.g., force close) the corresponding session 218. The device 210 can invalidate or remove a URL 216 when the corresponding session 218 ends. In embodiments, a session 218 can have a different time out value 220 from one or more other sessions 218. In some embodiments, each session 218 can have or be assigned the same time out value 220.

Clients 165 can include any form of a computing device described herein. The clients 165 can generate a request 204 for at least one server 195 or for an application or resource provided by at least one server 195. The request 204 can identify or indicate the server 195 and/or the application. The request 204 can identify or indicate the client 165 transmitting the request 204. The client 165 can transmit or provide the request 204 to the device 210 through at least one connection 250. For example, the clients 165 can connect with the device 210 and/or one or more servers 195 through one or more connections 250. The client 165 can establish a connection 250 to the device 210 to access or request access to at least one server 195 or an application provided by a server 195.

The connections 250 can include a channel, connection or session between a client 165 and the device 210, between the device 210 and a server 195 and/or between a client 165 and a server 195. In some embodiments, the connections 250 can include encrypted and/or secure connections 252. For example, the connections 250 may include encrypted sessions and/or secure sessions. The encrypted connections 250 can include encrypted files, data and/or traffic transmitted between a client 165 and the device 210, between the device 210 and a server 195 and/or between a client 165 and a server 195.

In some embodiments, a client 165 can include or execute an autonomous program 206. In embodiments, an autonomous program 206 can imitate a client 165 can initiate a connection or attempt to connect to the device 210. The autonomous program 206 can include or correspond to a bot or web robot configured to behave like a human user of a client 165. For example, the autonomous program 206 can imitate or replace human user behavior and perform tasks, such as but not limited to, interacting with or following a link provided within a response 222 or a web page 230. In embodiments, the autonomous program 206 provide one or more requests 24 to the device 210. For example, the autonomous program 206 can interact with a URL 216 provided within a response 222 to the client 165 executing the autonomous program 206 or to the autonomous program

206. The autonomous program 206 can generate a request 204 to the URL 216 and forward the request 204 to the device 210.

Servers 195 can include or deployed as, and/or be executed on any type and form of computing device, such as any desktop computer, laptop computer, or mobile device capable of communication over at least one network and performing the operations described herein. For example, servers 195 can include or correspond to one computer, a plurality of computers, or a network of distributed computers such as computer 100 shown in FIG. 1A. In embodiments, servers 195 can executes one or more applications on behalf of one or more of clients 165 (e.g., as an application server), although other uses are possible, such as a file server, gateway server, proxy server, or other similar server uses. Clients 165 may seek access to hosted applications on servers 106. The applications may include network applications that are served from and/or hosted on one or more servers (e.g., server 195, remote servers, application servers). The applications can include an application hosted on at least one server 195 and accessed by at least one client 165 via a network 170. The applications can include, but not limited to, a web application, a desktop application, remote-hosted application, a virtual application, a software as a service (SaaS) application, a mobile application, an HDX application, a local application, a native application (e.g., native to the client device), and/or a device couple with one or more of the clients 165.

Each of the above-mentioned elements or entities is implemented in hardware, or a combination of hardware and software, in one or more embodiments. Each component of the device 210 may be implemented using hardware or a combination of hardware or software detailed above in connection with FIGS. 1A-1B. For instance, each of these elements or entities can include any application, program, library, script, task, service, process or any type and form of executable instructions executing on hardware of a client device (e.g., device 210). The hardware includes circuitry such as one or more processors 105 in one or more embodiments.

Figure 3A:
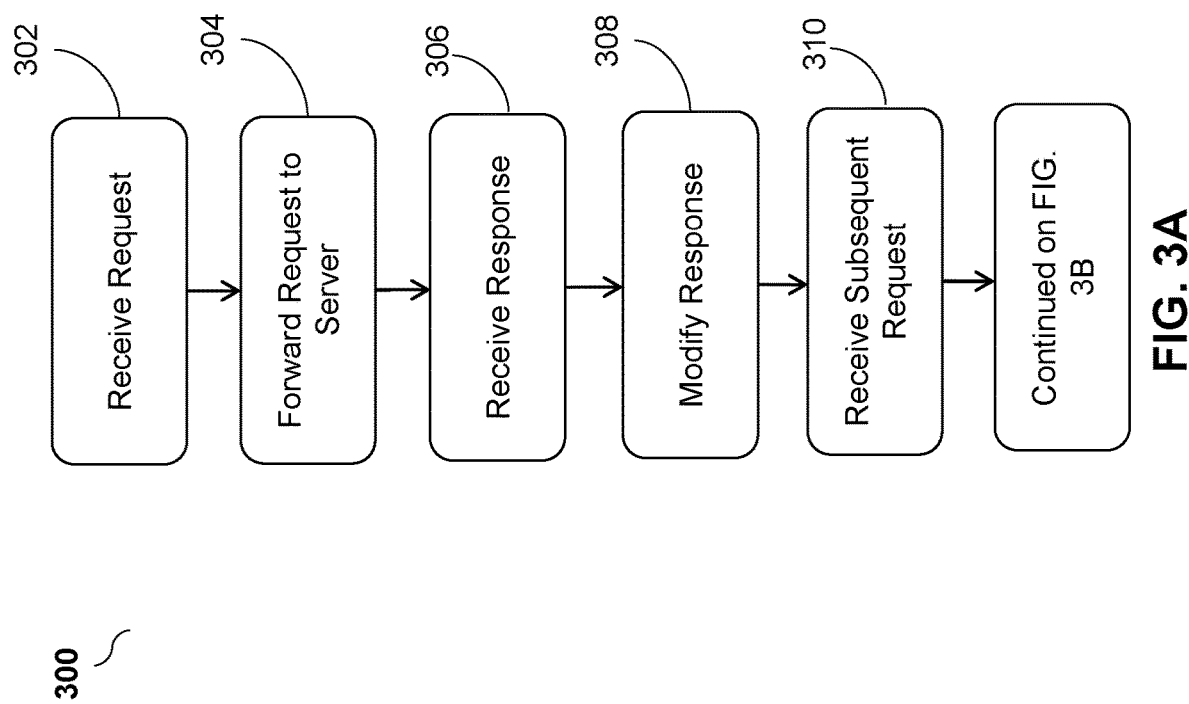
FIGS. 3A-3B are a flow diagram of a method for generating URLs to detect autonomous programs, in accordance with an illustrative embodiment.
Figure 3B:
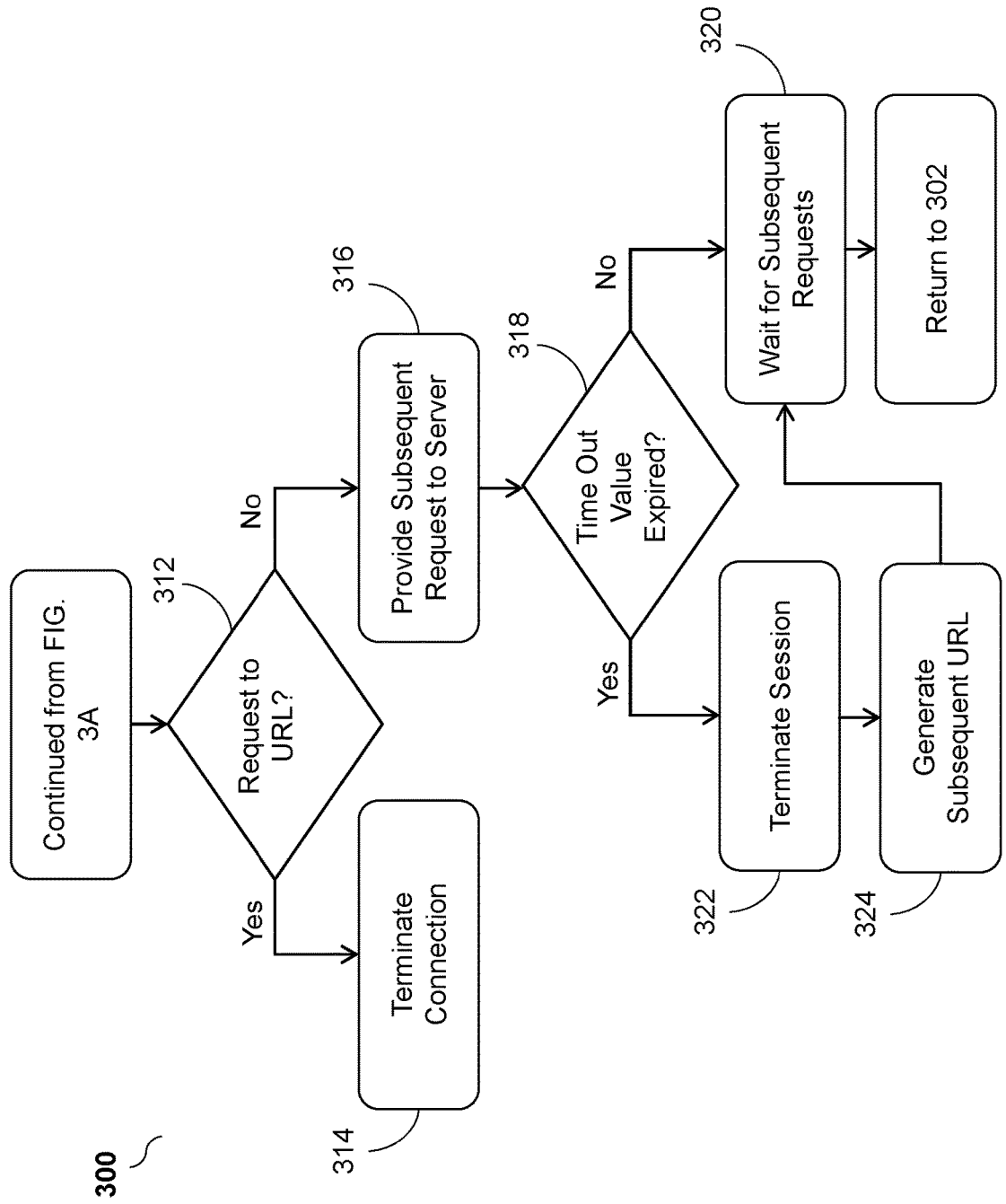

Referring now to FIGS. 3A-3B, depicted is a flow diagram of one embodiment of a method 300 for generating URLs to detect autonomous programs. The functionalities of the method 300 may be implemented using, or performed by, the components detailed herein in connection with FIGS. 1A-2. In brief overview, the method 300 can include one or more of: receiving a request (302), forwarding the request to a server (304), receiving a response (306), modifying the response (308), receiving a subsequent request (310), determining if the request is to a URL (312), if yes, terminating a connection (314), if no, providing the subsequent request to a server (316), determining if a time out value has ended (318), if no, waiting for subsequent requests (320), if yes, terminating a session (322), and modifying one or more subsequent responses (324). Any of the foregoing operations may be performed by any one or more of the components or devices described herein, for example, the device 210 or processor 105.

Referring to (302), and in some embodiments, a request can be received. A device 210, intermediary to a plurality of clients 165 and a plurality of servers 195 can receive one or more requests 204 from one or more clients 165 to one or more servers 195.

In embodiments, the device 210 can receive a first request 204 from a first client 165 of the plurality of clients 165 to a server 195 of the plurality of servers 195 via a connection 250 between the device 210 and the first client 165. The requests 204 can be received through or via one or more connections 250 between the one or more clients 165 and the device 210. For example, the device 210 can establish a connection 250 to a client 165 to receive requests 204 and provide or forward responses 222. The request 204 can include, but not limited to, a Hypertext Transfer Protocol (HTTP) request or a Hypertext Transfer Protocol Secure (HTTPS) request. In embodiments, the request 204 can include a header or header portion and a body or body portion. The client 165 can generate and provide a request 204 to the device 210 for at least one server 195. For example, the request 204 can be for an application provided by the respective server 195. The request 204 can identify the server 195 and/or an application for the client 165 to access. The request 204 can indicate or identify the device 210.

Referring to (304), and in some embodiments, the request can be forwarded to a server. The device 210 can receive the request 204 from the client 165 and identify at least one server 195 of a plurality of servers 195 to provide or forward the request 204. In embodiments, the request 204 can indicate the intended server 195 or the device 210 can select at least one server 195 to handle the request 204 based in part on one or more applications provided by or hosted by the server 195. The device 210 can forward the request 204 to the server 195 through at least one connection 250 between the device 210 and the server 195. The device 210 can provide the request 204 (e.g., first request) to the server 195 and the request 204 can include a Hypertext Transfer Protocol (HTTP) request.

Referring to (306), and in some embodiments, a response can be received. The device 210 can receive a response 222 from the server 195 in response to the request 204 forwarded to the server 195. The response 222 can include or indicate an application or resource requested by the client 165 and/or action taken corresponding to an application or resource requested by the client 165. The response 222 can include, but not limited to, a Hypertext Markup Language (HTML) response. The response 222 can include, but not limited to, a HTTP response or a HTTPS response. In embodiments, the response 222 can include a header or header portion and a body or body portion. The device 210 can receive the response 222 and determine the intended or target client 165 to receive the response 222.

Referring to (308), and in some embodiments, the response can be modified. The device 210 can modify the response 222 prior to forwarding the response 222 to the client. In embodiments, the device 210 can include or insert into the response 222 from the server 195 to the first client 165 or other client 165, a uniform resource locator (URL) 216 having one or more randomly generated characters 232 within a predetermined character space. The device 210 can modify the HTTP response 222 from the server 195 to include the URL 216. The device 210 can provide the first client 165, the HTTP response 222 with the URL 216. The device 210 can generate the URL 216 to trap autonomous programs 206 (e.g., bots). For example, the device 210 can generate the URL 216 as a HTML hyperlink to a single space character (e.g., predetermined character space) of a web page 230 or a blank web page. The URL 216 can include a hidden link, false or fake link embedded within a response 222 or web page 230. The URL 216 can include or correspond to an icon, graphic or text included within a response 222 or web page 230 that links to, directs to or points to a single space character of a web page 230.

The device 210 can randomly generate the URL 216 or generate the URL 216 such that the URL 216 does not correspond to a predicted pattern. For example, the device 210 can generate the URL 216 to include one or more random alphanumeric characters 232. In embodiments, the device 210 can generate the URL 216 to include one or more randomly selected or generated numerals, letters and/or random alphanumeric characters 232 or randomly selected or generated combination of numerals, letters and/or random alphanumeric characters 232. The URL 216 can include or correspond to a tracking URL, tracking tool or web beacon. For example, the device 210 can detect, monitor and track request to the URL 216 to identify actions by autonomous programs 206. The device 210 can generate the URL 216 such that the URL 216 is blank, invisible or not visible to a human eye and/or a user of one or more clients 165 of the plurality of clients 165. In embodiments, the device 210 can generate the URL 216 to be one of blank or invisible to on a web page 230 displayed on one or more clients 165 of the plurality of clients 165. The device 210 can include the URL 216 into a header portion or body portion of the response 222. The device 210 can include the URL 216 in the response 222 to the client and provide the response 222 to the client 165 through at least one connection 250 between the device 210 and the client 165.

In some embodiments, the device 210 can include the URL 216 in a plurality of responses 222 provided to a plurality of clients 165. In embodiments, the device 210 can include the URL 216 in a plurality of different responses 222 provided to a plurality of different clients 165 such that the same or similar URL 216 is provided to multiple clients 165 of a common network or cluster and connected to the device 210. For example, the device 210 can provide the response 222 with the URL 216 to multiple clients 165 of the plurality of clients 165 connected to the device 210. The device 210 can provide the response 222 with the same URL 216 to multiple clients 165. In some embodiments, the device 210 can include the URL 216 in or more different responses 222 for one or more different clients 165 and provide the different responses 222 to the one or more different clients 165.

In embodiments, the device 210 can include a plurality of URLs within a response 222 to a client 165. The plurality of URLs 216 can include the URL 216 having one or more randomly generated characters 232 and one or more URLs corresponding to one or more real or valid addresses of one or more other web pages 230. For example, the device 210 can include the URL 216 that appears invisible to a user of the client 165 and one or more URLs that are visible to the user of the client 165. The URL 216 can correspond to a fake or tracking web page 230. The visible URLs can link with or be associated with valid web pages 230 provided by the servers 195. The device 210 can track and monitor requests to the hidden URL 216 to detect behavior from an autonomous program 206.

Referring to (310), and in some embodiments, one or more subsequent requests can be received. The device 210 can receive one or more subsequent requests 204 from one or more clients 165. The device 210 can receive a second request 204 or subsequent request 204 from the first client 165 or client 165 that provided the first request 204. In embodiments, the device 210 can receive multiple requests 204 from a plurality of different clients 165. Referring to (312), and in some embodiments, a determination can be made if a subsequent request includes the URL 216. The device 210 can determine or detect if the request 204 is to the URL 216, identifies the URL 216 or is a request to access the URL 216.

Referring to (314)), and in some embodiments, the device can determine the request is to the URL. The device 210 can determine that the second request 204 or subsequent request 204 is to or for the URL 216. The device 210 can determine that the first client 165 has an autonomous program 206 or is executing an autonomous program 206 responsive to receiving a second request 204 from the first client using the URL 216. For example, the URL 216 can be hidden or invisible to a human user of a client 165 and can be used to detect actions taken or performed by an autonomous program 206. The autonomous program 206 can include or correspond to a bot that interacts with or follows every link or URL (e.g., URL 216) provided within a response 222 or web page 230. In embodiments, a request 204 to the URL 216 can correspond to an action taken or executed by an autonomous program 206 (e.g., bot) executing at a client 165 or executing within the network 170. The device 210 can terminate or end a connection 250 to the first client 165 or other client 165 that transmitted the request 204 for the URL 216 responsive to determination. The device 210 can determine that the client 165 is an autonomous program 206, has an autonomous program 206 or is executing an autonomous program 206 and end or terminate one or more connections 250 to the respective client 165. In embodiments, the device 210 can sign out or close the connection 250 to the client 165 or autonomous program 206 executing on the client 165.

Referring to (316), and in some embodiments, the device can determine the request does not include or indicate the URL 216. The device 210 can determine that the second request 204 or subsequent request 204 is to at least one server 195 and does not include or identify the URL 216 having the one or more randomly generated characters 232. The device 210 can provide the one or more subsequent requests 204 to the requested or identified one or more servers 195. The device 210 can determine the requested server 195 or select at least one server 195 for a request 204. The device 210 can forward the one or more subsequent requests 204 through one or more connections 250 to the requested or identified one or more servers 195.

Referring to (318), and in some embodiments, the device can determine if a time out value expired. The device 210 can generate or establish a session 218 for the URL 216. The session 218 can include a period of time that a URL 216 is active or enabled for tracking traffic, tracking requests and/or other forms of monitoring of requests to the respective URL 216 by the device 210. The device 210 can generate a time out value 220 for the session 218 or associated with the session 218. The time out value 220 can correspond to a lifespan or period of time when the session 218 and URL 216 are valid or active. The device 210 can provide the URL 216 to one or more clients 165 such that the URL 216 is active and available for the respective clients 165 to interact with (e.g., click on, follow). The device 210 can monitor a session 218 for the URL 216 using the time out value 220. In embodiments, the device can determine to update and/or replace the URL 216 with a new or subsequent URL 216 when the time out value 220 of the session 218 expires.

Referring to (320), and in some embodiments, the device can determine the time out value has not expired. The device 210 can determine that the session 218 associated with the URL 216 is still active and the time out value 220 has not expired. The device 210 can determine that the URL 216 is still active and available to one or more clients 165 through one or more previously provided responses 222 and/or web pages 230. The device 210 can wait for subsequent requests 204 from one or more clients 165 and return to (302) of method 300.

Referring to (322), and in some embodiments, the device can determine that the time out value has expired. The device 210 can determine or detect that a time out value 220 for a session 218 has expired. The device 210 can determine that the URL 216 has been available to the first client 165 or one or more other clients 165 for a period of time equal to the time out value 220 and terminate the session 218 and the URL 216. For example, the device 210 can time out (e.g., forcibly time out) or terminate the session 218 causing a status of the URL 216 to change from active to inactive or timed out. In embodiments, after the session 218 is terminated, the URL 216 may not function or indicate to a user that the URL 216 is an invalid link if a client 165 attempts to interact with the URL 216.

Referring to (324), and in some embodiments, a sequent URL can be generated. The device 210 can generate a new or subsequent URL 216 in response to terminating or making the first or previous URL 216 inactive. The device 210 can generate or establish a new or subsequent session 218 for the subsequent URL 216. The subsequent session 218 can include a time out value 220. In embodiments, the time out value 220 for one or more sessions 218 can be different from the time out value 220 for one or more other sessions 218. In some embodiments, the time out value 220 can be the same for each session 218.

The device 210 can provide the subsequent URL 216 to one or more clients 165 in one or more subsequent responses 222. For example, the device 210 can one or more responses 222 prior to forwarding the response 222 to one or more clients 165 to include the subsequent URL 216. In embodiments, the device 210 can include or insert into the response 222 from the server 195 to a client 165 the subsequent URL 216 having one or more randomly generated characters 232. The method 300 can return to (302) to wait for subsequent requests 204.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method comprising:
receiving, by a device intermediary to a plurality of clients and a plurality of servers, a first request from a first client of the plurality of clients to a server of the plurality of servers via a connection between the device and the first client;
including, by the device into a response from the server to the first client for a web page displayed on the first client, a uniform resource locator (URL) comprising one or more randomly generated characters within a predetermined character space, the URL to be one of blank or invisible on the web page displayed on the first client;
determining, by the device, that the first client has an autonomous program responsive to receiving a second request from the first client using the URL that is one of blank or invisible on the web page displayed on the first client; and
terminating, by the device responsive to the determination that the first client has the autonomous program based on receiving the second request that used the URL that is one of blank or invisible on the web page displayed on the first client, the connection to the first client.

2. The method of claim 1, further comprising:
generating, by the device, the URL to include one or more random alphanumeric characters.

3. The method of claim 1, further comprising:
generating, by the device, the URL to be one of blank or invisible on a second web page displayed on one or more clients of the plurality of clients.

4. The method of claim 1, further comprising:
generating, by the device, a plurality of URLs within the web page, the plurality of URLs including the URL comprising the one or more randomly generated characters and one or more URLs corresponding to one or more valid addresses of one or more other web pages.

5. The method of claim 1, further comprising:
generating, by the device, a session associated with the URL having a time out value;
determining, by the device, the URL has been available to the first client for a period of time equal to the time out value; and
terminating, by the device, the session and the URL.

6. The method of claim 5, further comprising:
including, by the device, a subsequent URL in a subsequent response to the first client, the subsequent URL associated with a subsequent session.

7. The method of claim 1, further comprising:
providing, by the device, the response with the URL to multiple clients of the plurality of clients connected to the device.

8. The method of claim 1, further comprising:
providing, by the device, the first request to the server, the first request including a Hypertext Transfer Protocol (HTTP) request; and
receiving, by the device, the response from the server, the response including an HTTP response.

9. The method of claim 8, further comprising:
modifying, by the device, the HTTP response from the server to include the URL; and
providing, by the device to the first client, the HTTP response with the URL.

10. A system comprising:
a device intermediary to a plurality of clients and a plurality of servers, the device comprising one or more processors coupled to memory; and
wherein the device is configured to:
receive a first request from a first client of the plurality of clients to a server of the plurality of servers via a connection between the device and the first client;
include, into a response from the server to the first client for a web page displayed on the first client, a uniform resource locator (URL) comprising one or more randomly generated characters within a predetermined character space, the URL to be one of blank or invisible on the web page displayed on the first client;

determine that the first client has an autonomous program responsive to receiving a second request from the first client using the URL that is one of blank or invisible on the web page displayed on the first client; and terminate, responsive to the determination that the first client has the autonomous program based on receiving the second request that used the URL that is one of blank or invisible on the web page displayed on the first client, the connection to the first client.

11. The system of claim 10, wherein the device is further configured to:
generate the URL to include one or more random alphanumeric characters.

12. The system of claim 10, wherein the device is further configured to:
generate the URL to be one of blank or invisible on a second web page displayed on one or more clients of the plurality of clients.

13. The system of claim 10, wherein the device is further configured to:
generate a plurality of URLs within the web page, the plurality of URLs including the URL comprising the one or more randomly generated characters and one or more URLs corresponding to one or more valid addresses of one or more other web pages.

14. The system of claim 10, wherein the device is further configured to:
generate a session associated with the URL having a time out value;
determine the URL has been available to the first client for a period of time equal to the time out value; and
terminate the session and the URL.

15. The system of claim 14, wherein the device is further configured to:
include a subsequent URL in a subsequent response to the first client, the subsequent URL associated with a subsequent session.

16. The system of claim 10, wherein the device is further configured to:
provide the first request to the server, the first request including a Hypertext Transfer Protocol (HTTP) request; and
receive the response from the server, the response including an HTTP response.

17. The system of claim 16, wherein the device is further configured to:
modify the HTTP response from the server to include the URL; and
provide, to the first client, the HTTP response with the URL.

18. A non-transitory computer readable medium storing program instructions for causing one or more processors to:
receive a first request from a first client of a plurality of clients to a server of a plurality of servers via a connection to the first client;
include, into a response from the server to the first client for a web page displayed on the first client, a uniform resource locator (URL) comprising one or more randomly generated characters within a predetermined character space, the URL to be one of blank or invisible on the web page displayed on the first client;
determine that the first client has an autonomous program responsive to receiving a second request from the first client using the URL that is one of blank or invisible on the web page displayed on the first client; and
terminate, responsive to the determination that the first client has the autonomous program based on receiving the second request that used the URL that is one of blank or invisible on the web page displayed on the first client, the connection to the first client.

19. The non-transitory computer readable medium of claim 18, wherein the program instructions further cause the one or more processors to:
generate a session associated with the URL having a time out value;
determine the URL has been available to the first client for a period of time equal to the time out value; and
terminate the session and the URL.

20. The non-transitory computer readable medium of claim 19, wherein the program instructions further cause the one or more processors to:
include a subsequent URL in a subsequent response to the first client, the subsequent URL associated with a subsequent session.

* * * * *